United States Patent [19]

Lehoczky

[11] Patent Number: 4,840,538

[45] Date of Patent: Jun. 20, 1989

[54] INTERPOLAR BODY FOR COOLING SALIENT-TYPE ROTOR BY VENTILATION

[76] Inventor: Kalman N. Lehoczky, 5228 18th Ave. East, Bradenton, Fla. 34208

[21] Appl. No.: 86,501

[22] Filed: Aug. 18, 1987

[51] Int. Cl.[4] ............................................. F01D 5/18
[52] U.S. Cl. ................................ 416/96 A; 415/115; 415/175
[58] Field of Search ............... 415/115, 116, 175, 178; 416/95, 96 R, 96 A

[56] References Cited

U.S. PATENT DOCUMENTS

| | | | |
|---|---|---|---|
| 2,650,803 | 9/1953 | Rosskopf | 416/96 A |
| 3,433,015 | 3/1969 | Sneeden | 415/115 |
| 4,321,007 | 3/1982 | Dennison et al. | 415/175 |

FOREIGN PATENT DOCUMENTS 891635  3/1944  France ........................ 416/96 A Primary Examiner—Robert E. Garrett
Assistant Examiner—John T. Kwon

[57] ABSTRACT

A device for cooling the salient-type rotor of electrical machines in which interpolar bodies are placed between and parallel to the salient poles of a rotor creating narrow channels between the salient poles and the interpolar bodies, to effectively cool the salient poles by the cooling air blowing radially through the channels between the interpolar body and the salient poles, and the interpolar bodies having circumferentially extending top surface close to the internal surface of stator creating a circumferential channel between the interpolar body and the internal surface of stator, bridging the gap between the salient poles to reduce turbulences and energy losses created by the rotation of the rotor.

11 Claims, 3 Drawing Sheets

INTERPOLAR BODY FOR COOLING SALIENT-TYPE ROTOR BY VENTILATION

BACKGROUND OF THE INVENTION

The present invention relates to a device for cooling the salient-type rotor poles of an electrical machine such as synchronous machine.

The conventional path of the air circulation is the following: The radial air ducts in the stator core, the air/water heat exchangers, the return channels over and below the stator leading to the the room above and below the rotor, axially through inlet openings into the spider, radially through the rotor rim ducts, radially through the interpolar space between the salient poles, into the airgap between rotor and stator, and finally back into the radial air ducts in the stator core.

Additional flow paths may start from the spider, radially along the axial end surface of rotor rim, axially into the interpolar space and airgap between the rotor and stator. An alternative route may start from the the return channels above and below the stator, through fans mounted on the axial ends of the rim, into the interpolar space and airgap.

The ventilation system mentioned above has to take care of, among others, the cooling of the salient poles. The flow between the poles is complicated, because of the complex geometry and the fact that the poles are acting as pressure producing radial fan blades, increasing the circumferrential velocity component of the air. Therefore, the flow of air in the interpolar space is not only an axial or radial movement but it has also a rotational component perpendicular to the rotor shaft.

In order to organize the complex movement of air in the interpolar space it was proposed to use interpolar baffles extending over the whole axial length of the interpolar space. (Not patented). The cross-section of the known baffles, is a "U" - form. The "U" is closed against the rotor rim, and open against the internal surface of stator. The heads of the screws anchoring the baffle to the rim are located inside of the "U". The idea behind this solution is to guide the air, coming from the radial rim ducts, along the surface of the salient poles, providing an even and effective heat transfer from the pole surface to the cooling air. This objective is usually achieved, but the generated energy losses in turbulance at the open end of "U" section are considerable.

SUMMARY OF THE INVENTION

The object of the present invention is to provide a device for cooling salient-type rotor poles of an electrical machine, in which interpolar bodies are placed between and parallel to the salient poles creating narrow channels between the salient poles and the interpolar bodies and the interpolar bodies having a circumferentially extending top surface close to the internal surface of the stator creating a circumferential gap between the interpolar body and the internal surface of the stator, to effectively cool the salient poles by the air blowing through the channels between the interpolar body and the salient poles, and the interpolar body bridging the gap between the salient poles reduce the turbulances and energy losses created by the rotation of the rotor.

PREFERRED EMBODIMENT OF THE INVENTION

The objective of the present invention is to provide a device for cooling salient-type rotor poles of an electrical machine in order to effectively cool the field coils while eliminating the defects inherent in the conventional devices.

Figure 1:
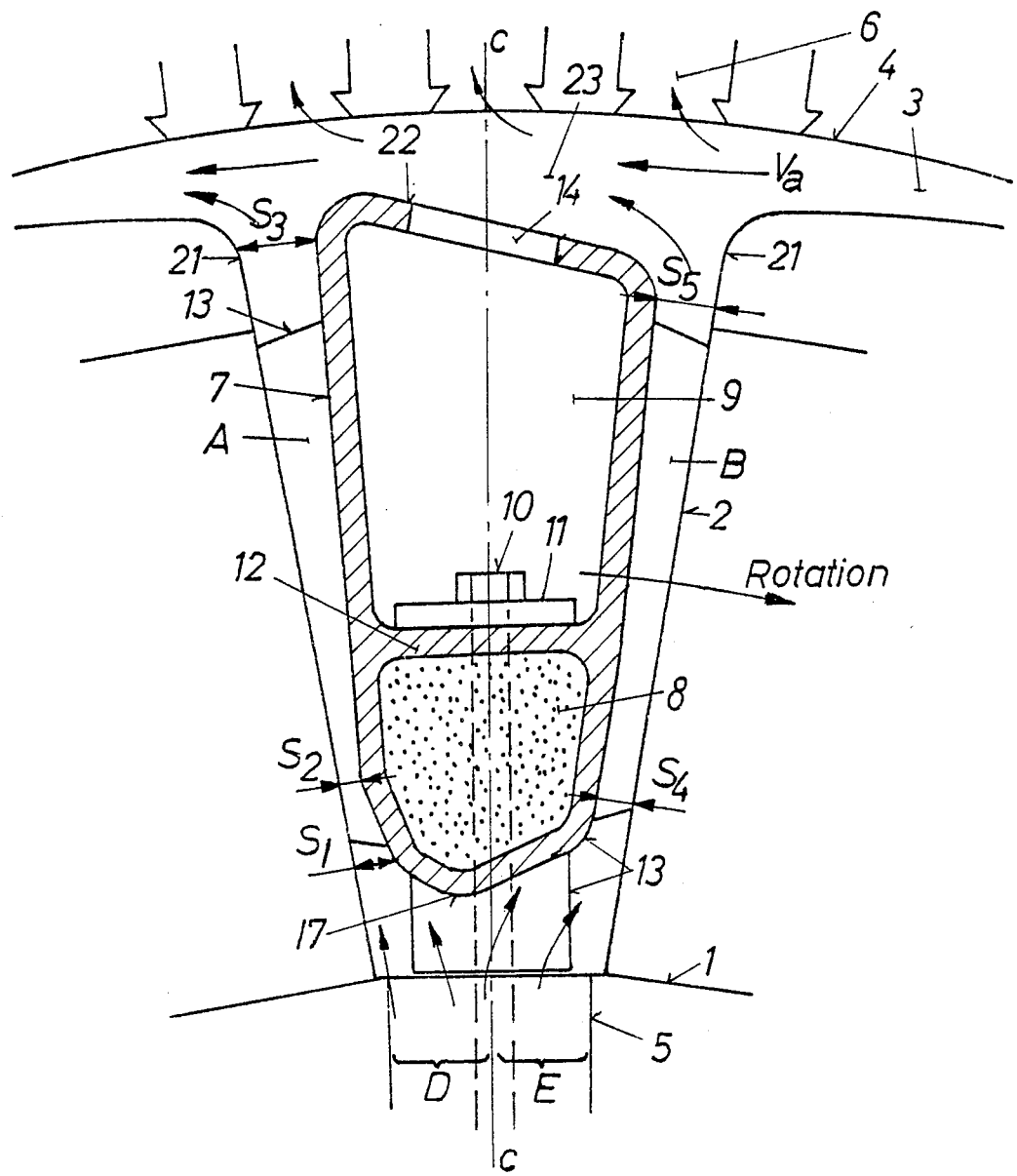
FIG. 1 is a section view of the interpolar area, perpendicular to the rotational axis.

FIG. 1 is a section view of the interpolar area. Reference numeral 1 denotes the rim and reference numeral 2 denotes the salient poles. The space between the the rim 1, the salient poles 2, the airgap 3 between the salient poles and the stator and the internal surface of stator core 4 is named as "interpolar space". The surface of the the core 4 is inmobile. The salient poles 2 and the rim 1 belonging to the rotor system rotates in the direction of the arrow. The rotor rim 1 is equipped with a plurality of radial ducts 5 supplying air to the the interpolar space. The stator, with its radial vents 6 is the recipient. The airflow paths are indicated with arrows.

The interpolar body 7 in accordance with the invention has a closed channel cross-section. The top surface 22 extending in circumferential direction more or less bridges the gap between the tips 21 of the salient poles. The surface of the rotor as a whole becomes smother causing a reduction of turbulances and energy loss. The top surface 22 creates a circumferential channel between the interpolar body and the internal surface of stator 4.

In this case, there are two channels in the interpolar body; the lower channel 8 and the upper channel 9. Generally, any or all of the channels may be filled with the same material as the channel walls or the filling can be a different material, such as a low density foam. The filled foam core provides a good combination of low weight and high structural rigidity. The anchoring screws 10 and washers 11 are acting against the intermediate wall 12 between the upper and lower channel; The upper channel 9 provides space for axial air flow.

The external side walls of the interpolar body are equipped with ribs 13 for positioning the interpolar body relative to the salient pole surface 2 or relative to the rim 1. These ribs or extensions may have other functions, such as preventing or guiding the air flow in certain direction and serving as pole coil clamp.

The distance between the the outer wall of the interpolar body and and the surface of the salient pole is changing from value S1 to S2 and finaly to S3. On the other side of the interpolar body, the change may be from S4 to S5. The purpose of the changes is to provide an efficient change from static to dynamic pressure or the opposite. The length and size of these converging and expanding sections may vary depending on the actual requirements on the heat transfer and pressure drop. The distance between the outer wall of the interpolar body and the salinet pole may vary along the axial length of interpolar body. This axial change of distance provides a possibility to control the axial distribution of flow and heat transfer.

In accordance with the invention the axial ends of the channels in the interpolar body may be open to provide access for the air to enter the one or more axial channels 8,9.

The intermediate wall 12 between the channels and/or the outer wall of channels may have a number of holes 14 for air circulation or for access to the screws 10. However these holes are small relative to the total top surface 22 in order to reduce the turbulances. The axial distribution of these holes may be uneven, for example concentrated around the axial middle section, in order to provide a forced cooling of the middle of stator core.

Figure 2:
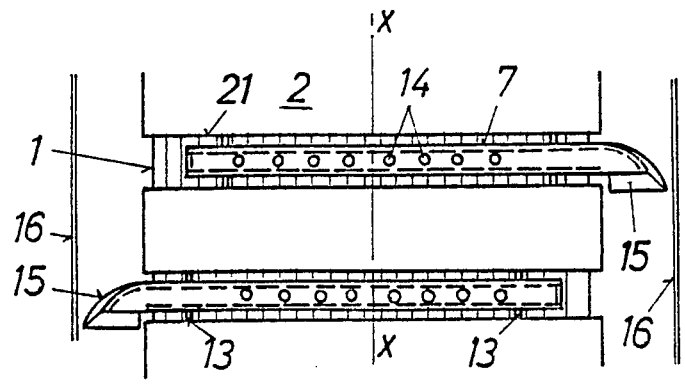
FIG. 2 is a view of rotor from the stator.
Figure 3:
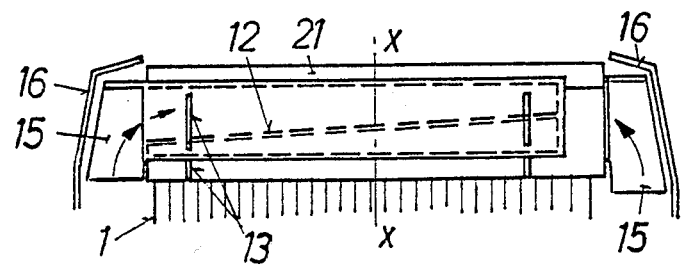
FIG. 3 is a longitudinal section view of the interpolar area.

In accordance to this invention the interpolar body may extend beyond the axial end of salient poles. See FIG. 2 and 3. The extended axial ends 15 of the interpolar body may have a scoop form guiding the air into the axial channels 8,9 in the interpolar body or into the gap between the interpolar body and the salient pole. The protruding end of the interpolar body pressurize the aforementioned channels and gaps.

The extended axial ends of the interpolar body may be formed as straight or bent radial or axial fan blades. This solution is particularly efficient when using an external baffle 16 limiting the leakage between the the interpolar body extension 15 and the external baffle 16.

In accordance to the invention the intermediate wall 12 may have a changing radial location along the interpolar body. See FIG. 3. By this means the cross-section of channels 8 and 9 may vary along the interpolar body. This feature influences the distribution of mechanical strength and the axial distribution of cooling air.

The air in the airgap 3, between the rotor and stator has a tangential velocity embodiment, Va, relative to the salient poles. The reason for this movement is that the air cannot move with the same velocity as the salient poles due to the friction on the internal stator surface 4. The air moves backward relative to the poles. The dynamic pressure from this movement influences the flow distribution through the gap "A" and "B" between the interpolar body and the salient poles. If the interpolar body has a completely symmetric cross-section relative to the interpolar center line C—C, the aforementioned velocity Va would reduce the flow through gap "A" relative to gap "B". In accordance to this invention the interpolar body's cross-section has to be higher on the "A"-gap side and lower on the "B" side. The result is a tilting top surface 22 and a converging channel 23. By this, a certain injector effect can be achieved, balancing the flow through "A" and "B".

The air supply through the rim ducts 5 is not evenly distributed along the rim circumference. There is a tendency that more air comes through the "D" side of the rim duct than through the "E" side. In accordance to this invention, the lower end of the interpolar body's crossection may be moved over to the "D" side in order to provide an equal air entrance into the gaps "A" and "B".

Figure 4:
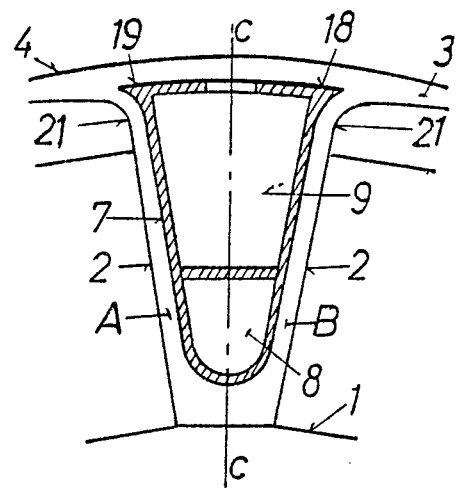
FIG. 4 is a section view of the interpolar area, perpendicular to the rotational axis.

Machines with none or with unsufficient air supply from the rim may be equipped with interpolar bodies in accordance to FIG. 4. The upper end of the interpolar body, which is in the direction of the rotation is higher than the tip of the salient pole 2 and creates a "leading" edge 18. This leading edge acts as an intake scoop utilizing the dynamic pressure from the tangential velocity component Va and diverting an airflow from the airgap through the gaps "A" and "B". The shape of outlet end 19 is less sensitive, however, it can be made symmetric to to the intake end 18. This solution provides a smooth surface against the internal surface of the stator 4 and consequently reduces turbulence and energy loss.

Number of interpolar bodies per rotor, number of channel 8,9 or holes 14 per interpolar body has to be chosen in accordance to the rotational speed, rotor and stator geometry. These are cases, where the electrical inter-connections between field coils or between sections of damper winding interfer with the interpolar body. Consequently, the length and symmetry of the interpolar body relatively to the symmetry axis X—X cannot be maintained. The invention covers solutions, where the interpolar bodies are different or placed differently in the different interpolar spaces. See FIG. 2 and 3.

Similarly, the shape, the number and distribution of anchoring screws 10, washers 11, or other anchoring devices has to be chosen in accordance with the static and dynamic forces and rotor geometry. Cases with high centrifugal velocity the screws can be replaced by dovetailed attachment matching dovetail shaped slots in the rotor rim 1.

Figure 5:
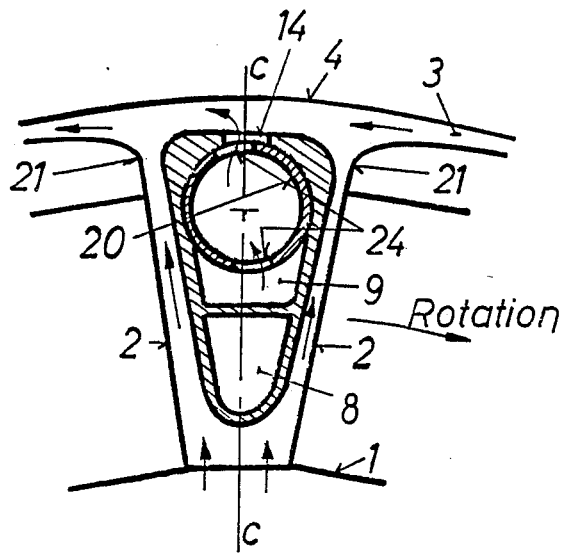
FIG. 5 is a section view of the interpolar area, perpendicular to the rotation axis.

In order to take care of adjustment of air flow or its distribution the interpolar body can be equipped with axially movable or transversally rotating members 20. These members can be equipped with openings 24 for the air flow. The axial ends of these controlling members may be formed as scopes extending beyond the axial ends of the salient poles. The member 20 presented in the FIG. 5 can be rotated around its longitudinal axis or moved parallel to its axis, as a drawer, influencing the air intake at the axial ends. These controlling devices can be installed permanently inside of the interpolar body or introduced later in connection with operational tests.

What is claimed is:

1. A device for cooling salient-type rotor poles of an electrical machine, comprising:
   a rim which serves as a yoke of the rotor and which has radially extending ventilation ducts for carrying cooling air therethrough;
   a plurality of spaced salient poles being mounted on the perphery of rim such that interpolar spaces are defined between adjacent ones,
   and creating a radial airgap between the salient poles and the internal surface of the stator;
   a plurality of interpolar bodies placed in the interpolar spaces providing radially extending ventilation gaps on both sides of the interpolar body and relative to the adjacent salient poles, and
   the interpolar bodies having a circumferentially extending top surface close to the internal surface of the stator creating a circumferential channel between the interpolar body and the internal surface of stator, and the top surface providing openings between the interpolar body and the tip of salient poles and corresponding to the radially extending ventilation gaps wherein internal parallel to the rotational axis, wherein at least some of the internal channels extending parallel to the rotational axis are filled with materials different from those constituent in the outer wall of the interpolar bodies.

2. The interpolar body of claim 1, equipped with ribs on the outer surface providing mechanical support relative to the rim and adjacent salient poles and creating guides for the air flow.

3. The interpolar body of claim 1, wherein the radially extending ventilation gaps between the interpolar body and the salient poles have chaning crossection along their radial extension.

4. The interpolar body of claim 1, wherein the radially extending ventilation gaps between the interpolar body and the salient poles have changing crossection along their extension parallel to the rotational axis.

5. The interpolar body of claim 4, wherein at least some of the internal channels extending parallel to the rotation axis are open at their axial ends.

6. The interpolar body of claim 1, wherein the interpolar body extends beyond the axial ends of the salient poles.

7. The interpolar body of claim 6, wherein the ends of the interpolar body are formed as fan blades.

8. The interpolar body of claim 1, wherein walls of the internal channels extending parallel to the rotation axis are equipped with holes for air transfer and access to the mechanical anchores.

9. The interpolar body of claim 1, wherein the cross-section of the internal channels extending parallel to the rotation axis have changing crossection along their extension parallel to the rotational axis.

10. The interpolar body of claim 1, wherein the circumferential channel between the interpolar body and the internal surface of stator has a changing cross-section along its circumferential extension due to the changing radial height of the interpolar body.

11. The interpolar body of claim 1, wherein the closest point of the interpolar body to the rotational axis is eccentrically located relative to the radial center line of the interpolar space.

* * * * *